US006922792B2

(12) United States Patent
Moser et al.

(10) Patent No.: US 6,922,792 B2
(45) Date of Patent: Jul. 26, 2005

(54) FAULT TOLERANCE FOR COMPUTER PROGRAMS THAT OPERATE OVER A COMMUNICATION NETWORK

(75) Inventors: Louise E. Moser, Santa Barbara, CA (US); Peter M. Melliar-Smith, Santa Barbara, CA (US)

(73) Assignee: Eternal Systems, Inc., San Jose, CA (US)

( * ) Notice: Subject to any disclaimer, the term of this patent is extended or adjusted under 35 U.S.C. 154(b) by 606 days.

(21) Appl. No.: 10/053,240

(22) Filed: Oct. 26, 2001

(65) Prior Publication Data

US 2002/0099973 A1 Jul. 25, 2002

Related U.S. Application Data

(60) Provisional application No. 60/244,077, filed on Oct. 27, 2000.

(51) Int. Cl.[7] .................................................. G06F 11/00
(52) U.S. Cl. ........................................... 714/4; 707/202
(58) Field of Search ............................... 714/4; 707/202

(56) References Cited

U.S. PATENT DOCUMENTS

| | | | |
|---|---|---|---|
| 4,819,159 A | | 4/1989 | Shipley et al. |
| 5,465,328 A | | 11/1995 | Dievendorff et al. |
| 5,586,310 A | | 12/1996 | Sharman |
| 5,737,738 A | | 4/1998 | Sharman |
| 6,014,673 A | * | 1/2000 | Davis et al. .................. 707/202 |
| 6,052,695 A | | 4/2000 | Abe et al. |
| 6,574,750 B1 | * | 6/2003 | Felber et al. .................. 714/20 |
| 6,694,447 B1 | * | 2/2004 | Leach et al. .................... 714/6 |
| 2002/0049776 A1 | * | 4/2002 | Aronoff et al. ............. 707/200 |
| 2002/0099973 A1 | * | 7/2002 | Moser et al. .................. 714/11 |

OTHER PUBLICATIONS

Bernstein, P.A. et al.; "Concurrency Control and Recovery in Database Systems," Cover Page, Preface–Contents, pp. xi thru xiii, pp. 1 thru 24, Addison–Wesley Publishing Comnpany, Reading, MA, 1987.

Gary, Jim and Reuter, Andreas; "Transaction Prcessing: Concepts and Techniques," Cover Page, Contents, pp. vii thru xxi, pp. 5 thru 7, pp. 117 thru 119, pp. 202 thru 205, Morgan Kaufman Publishers, San Mateo, CA, 1993.

Moser, L.E. et al.; "Consistent Object Replication in the Eternal System," Theory and Practice of Object Systems, vol. 4, No. 2, pp. 81–92, Jan., 1998.

Moser, L.E. et al.; "TOTEM: A Fault–Tolerant Multicast Group Communication System," Communications of the ACM, vol. 39, No. 4, pp. 54–63, Apr., 1996.

(Continued)

Primary Examiner—Scott Baderman
Assistant Examiner—Joshua Lohn
(74) Attorney, Agent, or Firm—John P. O'Banion

(57) ABSTRACT

Mechanisms for a Networked Enterprise Server that provide fault tolerance for computer programs that interact with computer programs within and between enterprises over a communication network, such as the Internet or a virtual private network. Fault tolerance is provided by unifying transaction processing and object or process replication. Transaction processing is used in this invention to protect the local data and processing against faults, while replication is used to protect the processing and communication that span multiple enterprises.

105 Claims, 13 Drawing Sheets

OTHER PUBLICATIONS

Object Management Group, CORBA Services Specification, "Transaction Service Specification," Cover Page, Copyright–documentation, 3 pages, Errata Sheet, pp. 1 & 2, Contents pp. i thru xii, Section 1 pp. 1–1 thru 1–18, Section 2 pp. 2–1 thru 2–64, Complete OMG IDL pp. A–1 thru A–8, Relationship to TP Standards pp. B1 thru B–12, Glossary pp. Gloss–1 thru Gloss. 6, Index pp. Index–1 & Index–2, Nov., 1997.

Object Management Group, CORBA Services Specification, "Fault Tolerant CORBA," pp. 25–1 thru 25–106, Jan., 2000.

Sieworek, D.P. and Swarz, R.S.; Reliable Computer Systems: Design and Evaluation, 2nd Edition, Cover Page, frontpiece, Contents pp. vii thru xi, Chapter I–The Theory of Reliable System Design, pp. 1 thru 33, Chapter 3–Reliability Techniques, pp. 79 thru 85, 169 thru 203, 207 thru 209, 213 thru 219, Digital Press, Burlington, MA, 1992.

Gray, Jim, Editor; "The Benchmark Handbook for Database and Transaction Processing Systems," Cover page, Table of Contents, pp. v thru ix, pp. 1 thru 17, Morgan Kaufmann Publishers, Inc., San Mateo, CA, 1991.

\* cited by examiner

|  | Client object C | Server object S | Action of Networked Enterprise Server (NES) |
|---|---|---|---|
| Case 1 | not in any transaction | not in any transaction | NES passes C's request message to S for processing —400 |
| Case 2 | not in any transaction | in transaction Ts | NES queues C's request message until transaction Ts commits and terminates —402 |
| Case 3 | in transaction Tc | not in any transaction | if C and S are within the same fault tolerance domain then NES passes C's request to S which enters the transaction —404 else NES rejects C's request —406 |
| Case 4 | in transaction Tc | in transaction Ts | if Tc = Ts then NES passes C's request to S which processes C's request —408 elseif C and S are within the same fault tolerance domain then NES queues C's request message until transaction Ts commits and terminates, and then NES passes C's request to S for processing —410 else NES rejects C's request —412 |
| Case 5 | — | Server object S | server object S enters new transaction —414 |

FIG. 8

FAULT TOLERANCE FOR COMPUTER PROGRAMS THAT OPERATE OVER A COMMUNICATION NETWORK

CROSS-REFERENCE TO RELATED APPLICATIONS

This application claims priority from U.S. provisional application Ser. No. 60/244,077 filed Oct. 27, 2000, incorporated herein by reference.

STATEMENT REGARDING FEDERALLY SPONSORED RESEARCH OR DEVELOPMENT

Not Applicable

REFERENCE TO A COMPUTER PROGRAM APPENDIX

Not Applicable

NOTICE OF MATERIAL SUBJECT TO COPYWRIGHT PROTECTION

A portion of the material in this patent document may subject to copyright protection under the copyright laws of the United States and of other countries. The owner of the copyright rights has no objection to the facsimile reproduction by anyone of the patent document or the patent disclosure, as it appears in the United States Patent and Trademark Office file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention relates generally to computer programs that must operate reliably and continuously as they interact with remote computer programs over a communication network, and more particularly to a method for providing fault tolerance by the unification of replication and transaction processing.

2. Description of the Background Art

With the increase in business-to-business interactions over the Internet, many computer systems must provide reliable and continuous operation despite faults. Traditional fault tolerance for computer systems has focused on protection of the processing operations of individual computers against faults. Many business computer systems use transaction processing to protect the data of the computer system against faults. In the event of a fault that prevents a transaction from being completed (e.g., committed), the transaction is aborted and the data are restored to the state at the start of the transaction.

Transaction processing protects the data of the computer system by ensuring that the data are left in a consistent final state, after the transaction commits, or a consistent initial state, after the transaction aborts, but not in an inconsistent partially processed state. In the event of a fault, all of the processing that the transaction performs on the data is lost and the client that initiated the transaction can retry the transaction.

Transactions work well for computer systems that act as servers to human clients. The human client can understand that a transaction has been aborted, that the processing has been lost, and that the transaction must be retried from the start. The human client can also understand that, when the transaction is retried, the results of the transaction might be different from the results that would have been obtained when the transaction was first attempted.

However, transactions are less effective when two computers, within different enterprises or within different divisions of the same enterprise, interact with each other over a communication network, such as the Internet or a virtual private network. The computer that is acting as the client does not have the intelligence of a human client. It is difficult to program the client computer to act appropriately when a transaction is aborted by the server, and it is difficult to program the client computer to handle any differences that might result between its first attempt to use the server and its retry after an abort.

In theory, it is possible to include the client computer of one enterprise and the server computer of another enterprise in a single distributed transaction. The transaction is initiated by the client computer, which acts as the coordinator of the transaction. If the client fails, or if communication between the two computers is lost at a critical moment during the committing of the transaction, the server hangs until the client is recovered. Consequently, in practice, distributed transactions are not used.

In the current state of the art, a cluster of computers can participate in a transaction, communicating over a network. However, the transaction is under the control of a central transaction coordinator. Similarly, the technology exists to allow several copies of a database to coexist, but a central controller must designate one of those copies as the primary copy and the other copies as backup copies. Technology that allows several computers to participate in a transaction, potentially over a network, also exists. In such a configuration, there is no central coordinator; rather, any processor can act as coordinator for the transactions that it initiates. However, there is only one coordinator that manages each transaction. Consequently, in an activity that spans the computers of several enterprises, each enterprise must allow transactions within its computers to be managed by a coordinator on a computer of another enterprise. Most enterprises would not permit other enterprises to use their computers in such a manner.

Therefore, a need exists for a fault tolerance technology that avoids the use of a central controller that controls activities that span the computers of several enterprises. The present invention satisfies that need, as well as others, and overcomes deficiencies in the current state of the art of fault tolerance technology.

BRIEF SUMMARY OF THE INVENTION

The present invention provides mechanisms for a Networked Enterprise Server that provides fault tolerance for computer applications that span multiple enterprises over a communication network by unifying replication and transaction processing. Transaction processing is used in this invention to protect the local data and processing against faults, while replication is used to protect the processing and communication that span multiple enterprises. The present invention achieves the benefits of transaction processing, and of reliable interactions over the network between the computers of different enterprises, without a central coordinator and without requiring any enterprise to allow its transactions to be controlled by a coordinator from another enterprise. Unification of replication and transaction processing provides the advantages of both strategies in a context where computer applications span multiple enterprises across a communication network, in which neither strategy would suffice by itself.

While the invention can be described in more general terms, use of standard object-oriented terminology will facilitate an understanding of the invention. An object that uses the mechanisms of this invention operates in one of two modes:

Networked. In this mode, an object on one computer can interact with objects on remote computers over a communication network. An object in Networked mode is protected against faults by the object replication system.

Transactional. In this mode, an object on one computer can interact with objects in a local database, but not with objects on remote computers over a communication network. An object in Transactional mode is protected against faults by the transaction processing system.

By default, objects operate in Networked mode. In Networked mode, an object can interact freely with other objects in its own computer, or with objects in remote computers over a communication network. The messages that convey such interactions, both request messages (that contain the method invocations) and reply messages (that contain the corresponding responses), are logged in a message log.

An object enters Transactional mode either by explicitly initiating a transaction, or by being invoked by another object that is part of a transaction. In Transactional mode, an object cannot invoke methods of a remote object across the network, and cannot accept request messages that originate from an object that is not part of the transaction.

An object leaves Transactional mode and returns to Networked mode when the transaction commits or aborts.

The present invention provides mechanisms for a Networked Enterprise Server that unifies the mechanisms of object replication and of transactions to ensure that a computer program can recover from a fault while it is communicating with remote computer programs over a communication network, so that:

(a) The computer program can continue to perform its intended functions despite the fault.

(b) The computer program can protect its data against corruption or inconsistency resulting from the fault.

(c) The computer program can continue its interactions with remote computers as if no fault had occurred.

(d) The computer program cannot disrupt the operation of the other computer programs, when it incurs a fault.

Further advantages of the invention will be brought out in the following portions of this document, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 8 is a table showing five cases in a server object's receipt of a client object's request message.

DETAILED DESCRIPTION OF THE INVENTION

Referring more specifically to the drawings for illustrative purposes, the present invention is described with reference to FIG. 1 through FIG. 13. It will be appreciated that the apparatus may vary as to configuration and as to details of the parts, and that the method may vary as to the specific steps and sequence, without departing from the basic concepts as disclosed herein.

The detailed description of the mechanisms for this invention uses standard object-oriented terminology as is used in C++, Java and other object-oriented programming languages, as well as in distributed object architectures such as CORBA (Common Object Request Broker Architecture), Java Remote Method Invocation and ActiveX/DCOM (Distributed Component Object Model). In particular, the description uses the following definitions:

An object is created during the execution of an object-oriented computer program, and is represented by attributes (data structures or variables) and methods (procedures).

In distributed object computing, based on the client-server model, a client object requests a server object to perform an operation or service for it. The client object sends a request message to the server object to invoke one of the server object's methods, which define the operations or services that the server object performs. The request message contains the name of the method and the arguments of the method. After executing the method, the server object responds by sending a reply message to the client object. The reply message contains the result of the method invocation.

Although much of the following description is given in terms of client objects and server objects, the mechanisms are general and each object can act as both a client and a server. This dual role is typically the case in networked applications that involve multiple enterprises in succession, such as supply chain applications. Because each object can play the role of both client and server, this invention applies not only to applications that are based on the client-server model but also to applications that are based on the peer-to-peer model.

The state of an object or an object's state is the values of the attributes of the object. An object's state can change over time. A change in the state of an object is a consequence of messages sent to the object that invoke methods of the object.

A replica of an object is a copy of the object that has the same state as the original object and that is typically hosted on a different computer.

Figure 1:
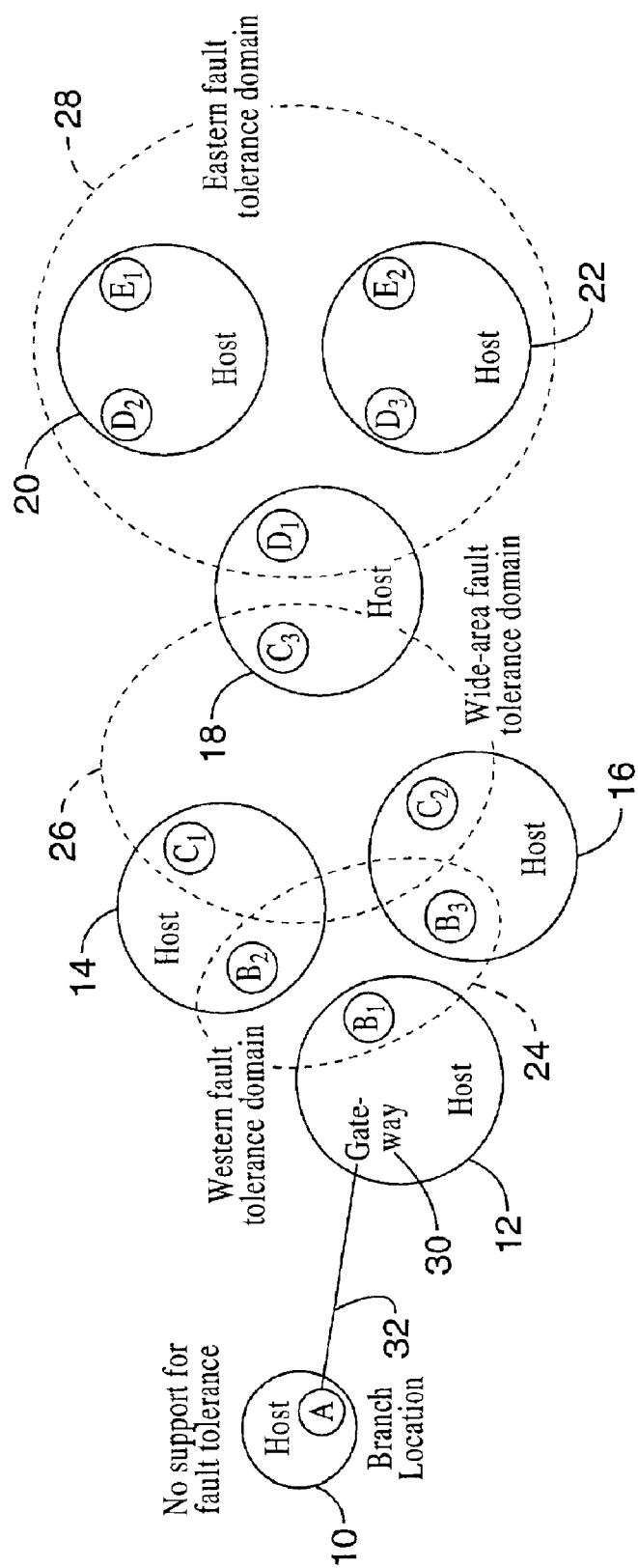
FIG. 1 is a diagram illustrating fault tolerance domains.

Objects are grouped together into fault tolerance domains, and all of the replicas of an object are located within a single fault tolerance domain, as shown in FIG. 1. For example, FIG. 1 shows a single computer or host at a branch location 10 and two clusters of computers or hosts 12, 14, 16 and 18, 20, 22. Three fault tolerance domains 24, 26, 28 are shown. Note that Host 14, Host 16 and Host 18 each participate in two fault tolerance domains, while Host 10, Host 20 and Host 22 participate in only one fault tolerance domain. Note that all of the replicas of object B are hosted within a single fault tolerance domain, as are all of the replicas of objects C, D and E. Object A, which is not part of any fault tolerance domain and is unreplicated, gains access into a fault tolerance domain through a gateway 30 via conventional Internet messages 32.

The present invention exploits transaction processing mechanisms that are well known in the art. In particular, it exploits the specification of the Object Transaction Service (OTS) standardized by the Object Management Group (OMG) (Object Management Group, Transaction Service Specification v1.2 (Final Draft), OMG Platform Technical Committee Document ptc/2000-11-07, January 2000), incorporated herein by reference. Note that this invention is equally applicable to other transaction service standards, such as the Java Transaction Service or the Microsoft Transaction Service.

The basic strategy of transaction processing systems is described here. A transaction must satisfy the standard ACID properties, namely, Atomicity, Consistency, Isolation, and Durability. Atomicity means that the system either will perform all individual operations on the data, or will assure that no partially completed operations leave any effects on the data. Consistency requires any execution of a transaction to take the database from one consistent state to another. Isolation requires that operations of concurrent transactions yield results that are indistinguishable from the results that would be obtained by forcing each transaction to be serially executed to completion in some order. Durability preserves the effects of committed transactions and ensures database consistency after recovery from a fault.

Figure 2:
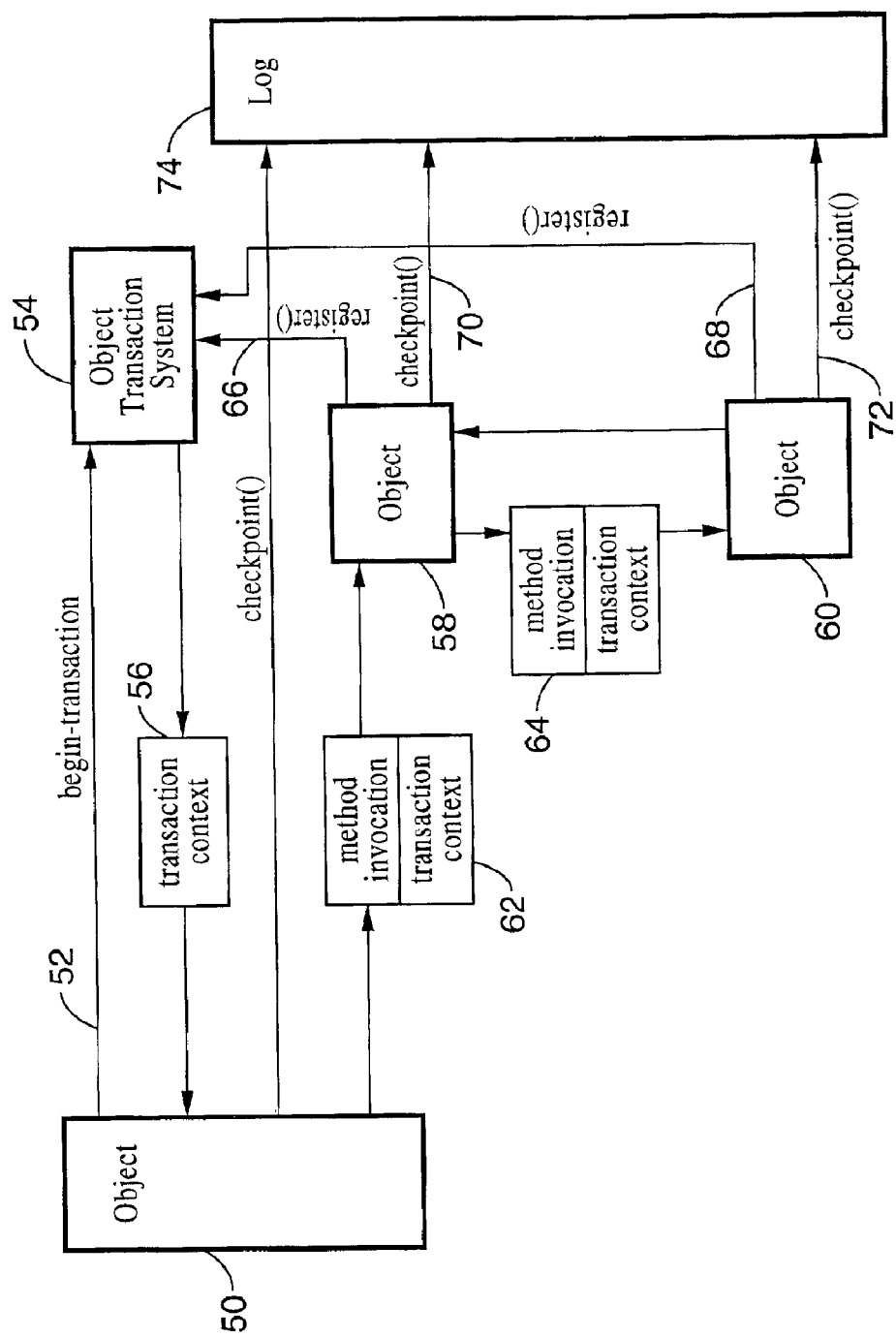
FIG. 2 is a diagram illustrating transaction processing and the use of the transaction context in request messages that contain method invocations.

As shown in FIG. 2, a transaction is initiated by an object 50 that invokes the begin-transaction( ) method 52 of the Object Transaction System 54. This invocation creates a unique transaction identifier and returns that transaction identifier in a transaction context 56. The object 50 that initiated the transaction becomes a member of the transaction. Whenever an object that is a member of a transaction such as object 50 or 58, invokes a method of another object such as object 58 or 60, the Object Transaction System 54 attaches the transaction context to the corresponding message that carries the invocation such as message 62 or 64. On receipt of the message carrying the transaction context, the invoked object 58 or 60 invokes the register( ) method 66 or 68 of the Object Transaction System 54, and becomes a member of the transaction. On becoming a member of the transaction, a checkpoint 70 or 72 of the current state of the object is stored in a log 74, so that the state can be restored, if necessary. The figure does not show that objects are located on different computers; however, throughout this description, it should be understood that objects can be located on different computers.

While an object is a member of a transaction, it cannot accept an invocation of any of its methods from an object that is not a member of that transaction. Such invocations are queued until the transaction completes.

Figure 3:
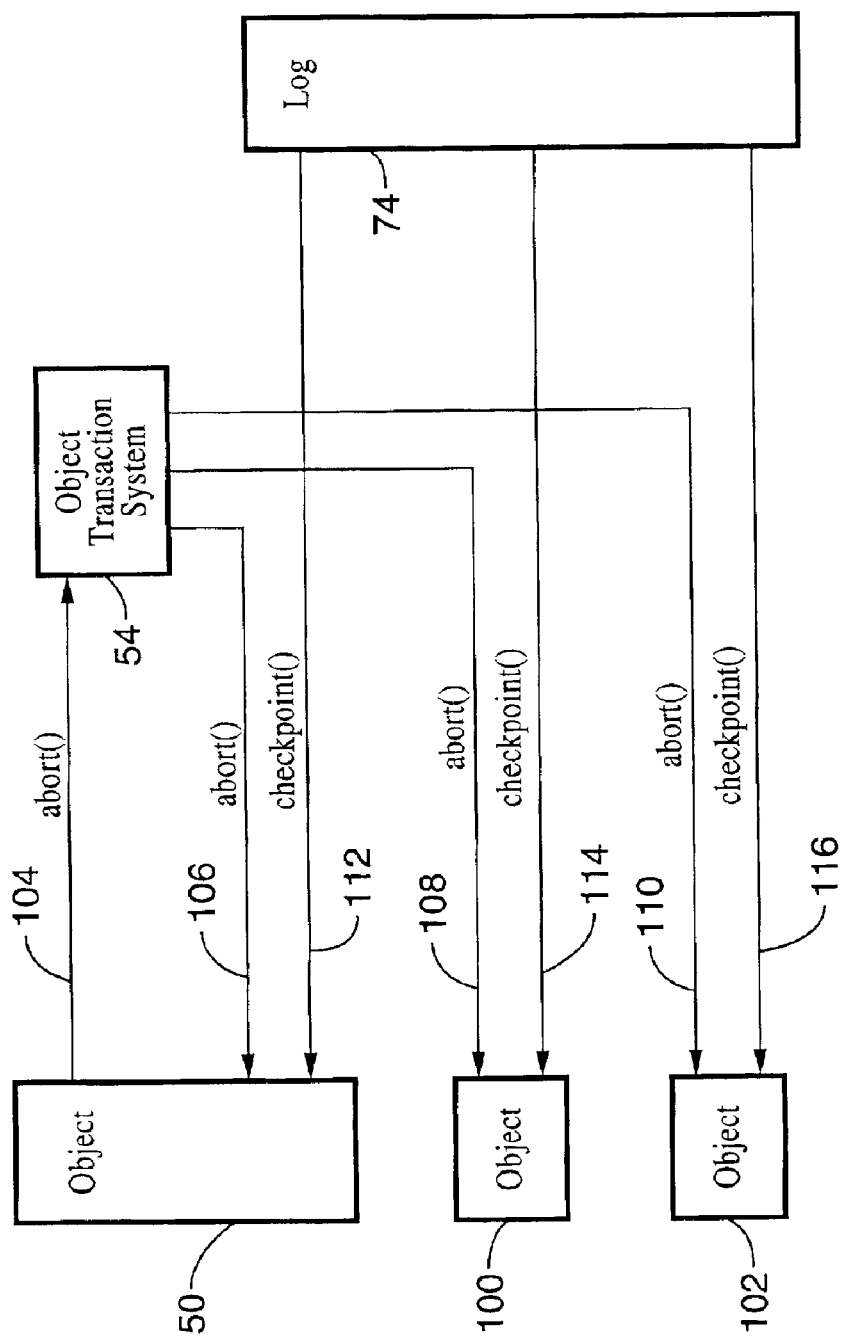
FIG. 3 is a diagram illustrating transaction abort.

A transaction completes, either by an abort (FIG. 3) or by a commit (FIG. 4), using a protocol known as the two-phase commit protocol. FIG. 3 shows a transaction containing three objects 50, 100, 102 being completed by an abort. Object 50 starts the abort by invoking the abort( ) method 104 of the Object Transaction System 54. The system then invokes the corresponding abort( ) method 106, 108, 110 on each member object of the transaction. The corresponding checkpoints 112, 114, 116 for those objects, which are stored in the log 74, are used to restore those objects to the states that they had immediately before they entered the transaction.

Figure 4:
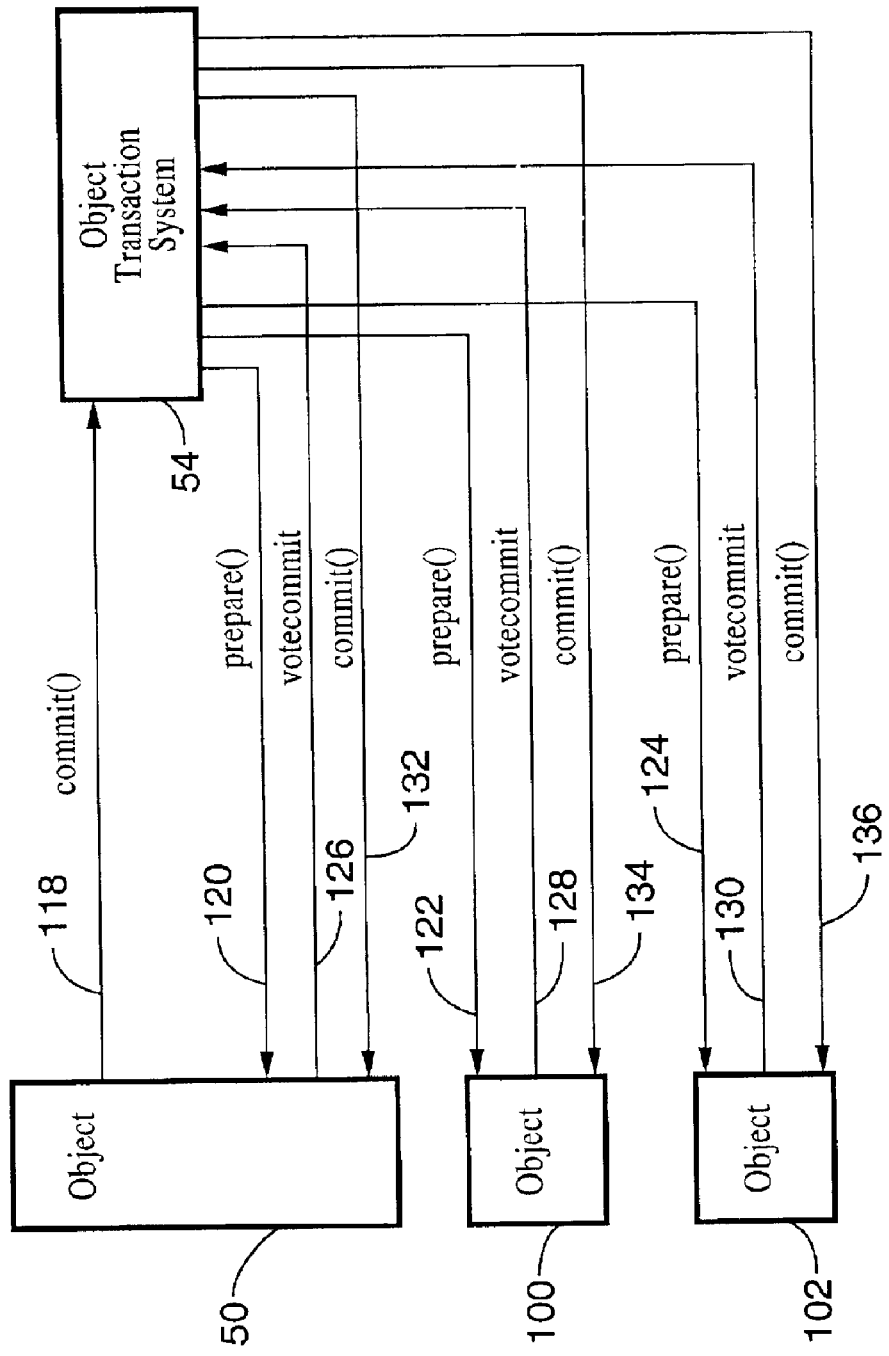
FIG. 4 is a diagram illustrating transaction commit.

FIG. 4 shows a transaction containing three objects 50, 100, 102 being completed by a commit. Object 50 invokes the commit( ) method 118 of the Object Transaction System 54. The system then invokes the corresponding prepare( ) method of each member of the transaction. If the object is able to commit the transaction, it returns a votecommit result; otherwise, it returns a voteabort result. The system collects votes from all of the objects that are members of the transaction. If all of those objects return votecommit 126, 128, 130, the system invokes the corresponding commit( ) method 132, 134, 136 of each of the members of the transaction. Each such member makes permanent its current state, including any updates resulting from the transaction, and exits the transaction. If any member returns a voteabort result, or if any member does not reply, the system invokes the corresponding abort( ) method 106, 108, 110 of each of the members of the transaction as shown in FIG. 3. Each such object then restores the state that it recorded on entry to the transaction and exits the transaction, as described above.

The present invention also exploits known mechanisms for fault tolerance by object replication (L. E. Moser, P. M. Melliar-Smith and P. Narasimhan, "Consistent object replication in the Eternal system," Theory and Practice of Object Systems, vol. 4, no. 2, January 1998, pp. 81–92) and for maintaining the consistency of the object replicas using a reliable totally-ordered multicast protocol (L. E. Moser, P. M. Melliar-Smith, D. A. Agarwal, R. K. Budhia and C. A. Lingley-Papadopoulos, "Totem: A fault-tolerant multicast group communication system," Communications of the ACM, vol. 39, no. 4, April 1996, pp. 54–63). Both publications are incorporated herein by reference.

Figure 5:
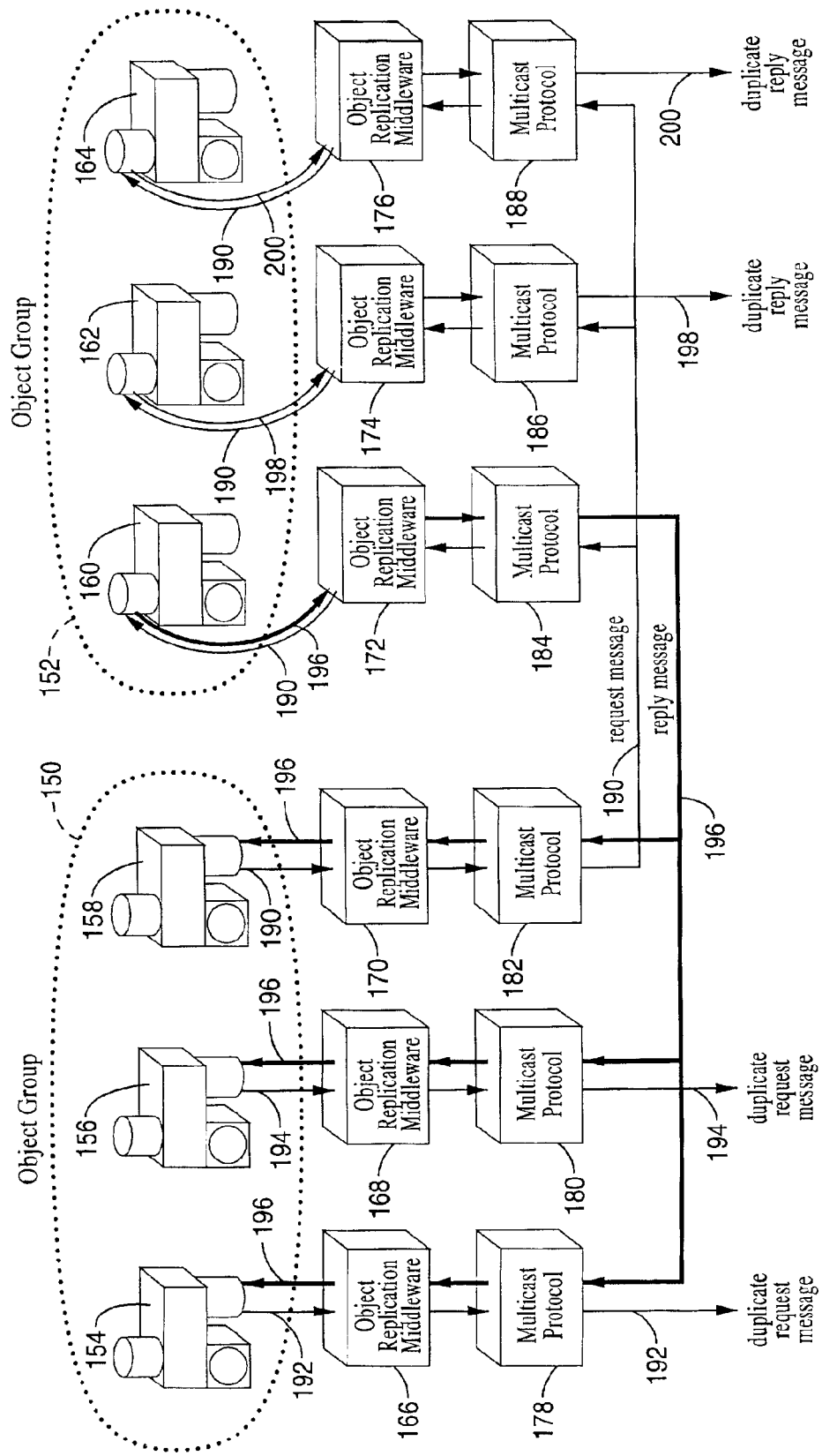
FIG. 5 is a diagram illustrating active replication.

The mechanisms described in those publications allow the system to maintain multiple replicas of an object and to ensure that the states of the replicas remain consistent. Referring to FIG. 5, object groups 150, 152 are each replicated in three ways. The replicas 154, 156, 158 and 160, 162, 164 of the respective object groups 150, 152 are supported by corresponding Object Replication Middleware 166, 168, 170 and 172, 174, 176 and by a corresponding Multicast Protocol 178, 180, 182 and 184, 186, 188. As shown in FIG. 5, one of the replicas 158 of an object group 150 invokes a method of an object group 152. The request message 190 containing that invocation is transmitted using a reliable totally-ordered multicast protocol to all of the replicas 160, 162, 164 in object group 152. Other objects within the fault tolerance domain can also invoke the methods of object group 152; their messages are also transmitted to object group 152 using the reliable totally-ordered multicast protocol. Objects outside the fault tolerance domain can also invoke the methods of object group 152; their messages are transmitted to a gateway that transmits them to object group 152 using the reliable totally-ordered multicast protocol. The protocol ensures that all of the replicas 160, 162, 164 in object group 152 receive the same messages in the same order. Consequently, they all perform the same operations in the same order, which maintains the consistency of the states of the replicas. Even though all three replicas 154, 156, 158 in object group 150 invoke the method of object group 152, only one request message 190 is delivered to the replicas 160, 162, 164 in object group 152. The two other duplicate request messages 192, 194 must be detected and suppressed. Similarly, only one reply message 196 is returned to the replicas 154, 156, 158 in object group 150. The two other duplicate reply messages 198, 200 are detected and suppressed.

Because objects are replicated, operation of the system can continue after a fault that affects one or more of the object replicas, as long as all such replicas are not so affected.

Fault-tolerant systems typically support two replication strategies: active replication and passive replication. Active replication and passive replication are terms that are well understood in the art (e.g., D. P. Sieworek and R. S. Swarz, Reliable Computer Systems: Design and Evaluation, 2nd edition, Burlington, Mass., Digital Press, 1992) and also (D. Powell, editor, Delta-4: A Generic Architecture for Dependable Distributed Computing, Springer Verlag, 1991, incorporated herein by reference).

The active replication strategy is illustrated in FIG. 5, where every replica 160, 164, 166 in object group 152 executes each method invoked on object group 152. If one of the replicas becomes faulty and cannot produce the result, the result is still available from the other replicas and object group 150 can continue as if no fault had occurred.

Figure 6:
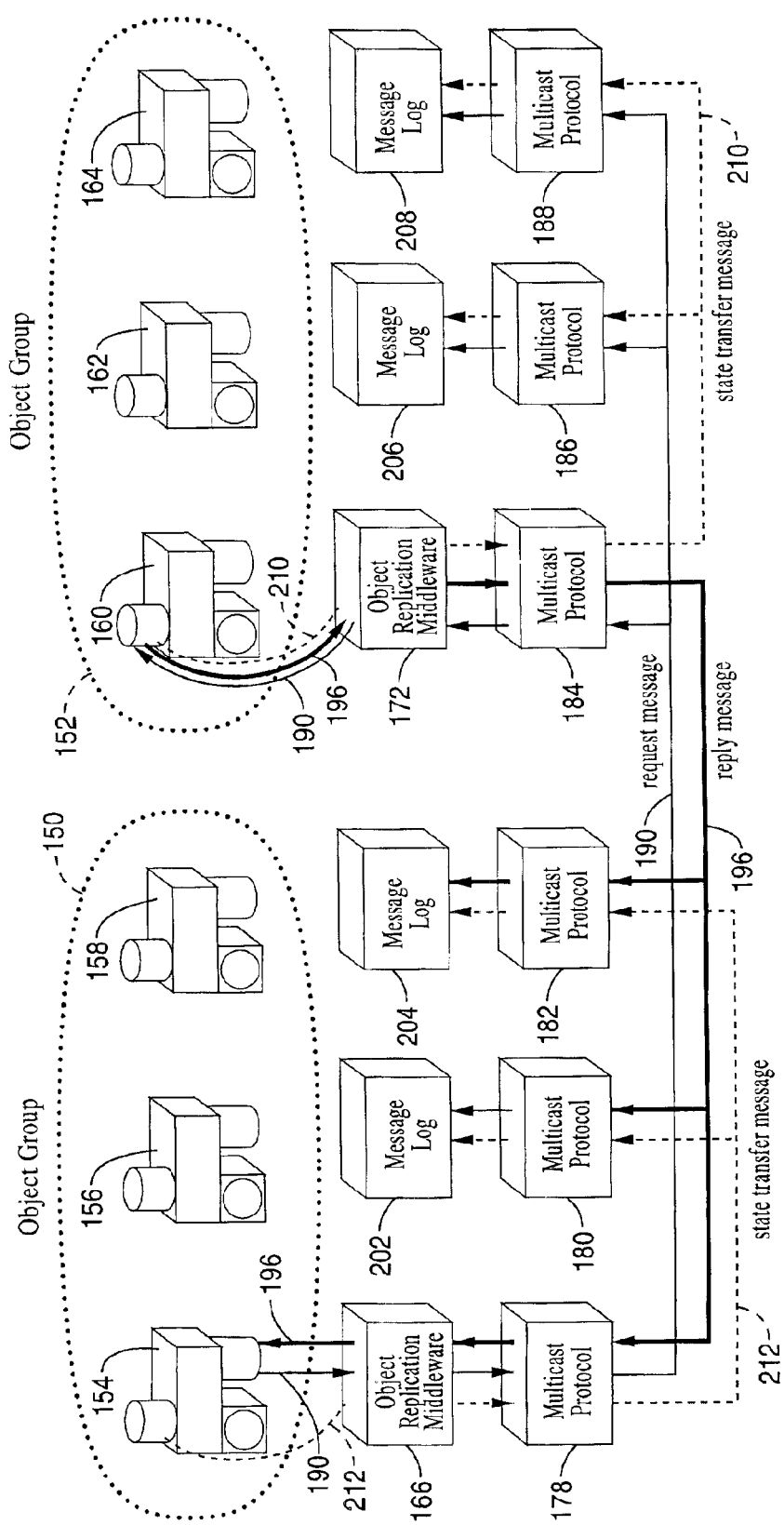
FIG. 6 is a diagram illustrating passive replication.

The passive replication strategy is illustrated in FIG. 6, where only one replica 160 in object group 152, the primary replica, executes the methods invoked on object group 152. Other replicas 162, 164, the backup replicas, do not execute the methods invoked on object group 152. Instead, at each backup replica 156, 158 and 162, 164 the request message 190 and the reply message 196 are recorded in respective message logs 202, 204 and 206, 208.

Periodically, the state of the primary replica 160 is transferred to the backup replicas 162,164. The get_state( ) method is invoked on the primary replica 160, and returns a serialized structure that encodes the current state of the object. The structure is transmitted in a set_state( ) state transfer message 210 to the backup replicas 162, 164. Both the get_state( ) and the set_state( ) methods are recorded in the corresponding message logs 206, 208 along with the other request and reply messages that contain, respectively, the method invocations and responses. A similar state transfer message 212 is used to transfer the state from the primary replica 154 in object group 150 to the backup replicas 156, 158 of that same object group.

Figure 7:
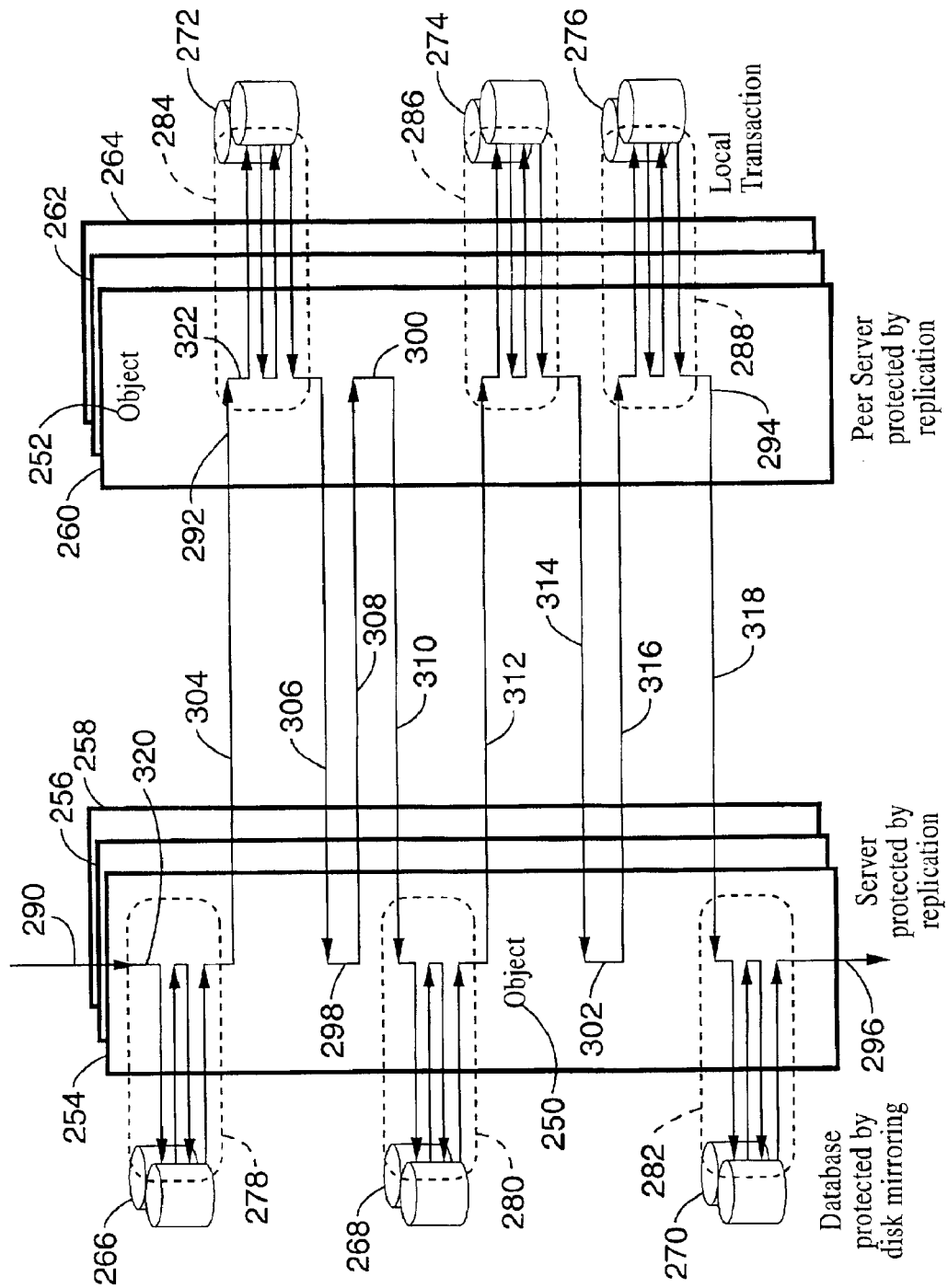
FIG. 7 is a diagram illustrating operation of the present invention.

FIG. 7 illustrates the use of the invention to provide fault tolerance for computer applications that span multiple enterprises over a communication network by the unification of replication and transaction processing. In FIG. 7, two objects 250, 252 are shown interacting over the communication network. The strategy of the invention does not distinguish between client objects and server objects; each object can invoke a method of the other object, and each can process requests from the other object. Thus, the invention applies to the peer-to-peer model, as well as to the client-server model, of distributed computing. Moreover, the strategy is not restricted to only two objects; it applies to any number of objects interacting in any sequence and in any topology.

FIG. 7 shows that objects are replicated for fault tolerance. Object 250 is replicated three ways, shown by three superimposed boxes 254, 256, 258, and object 252 is replicated three ways, shown by three superimposed boxes 260, 262, 264. The number of replicas is determined by the reliability needs of the application.

FIG. 7 shows that each object has access to one or more databases 266, 268, 270 and 272, 274, 276, which are assumed to provide their own fault tolerance using well-known transactional mechanisms (P. A. Bernstein, V. Hadzilacos and N. Goodman, Concurrency Control and Recovery in Database Systems, Addison-Wesley Publishing Company, Reading, Mass., 1987, and also J. Gray and A. Reuter, Transaction Processing: Concepts and Techniques, Morgan Kaufmann Publishers, San Mateo, Calif., 1993). Both publications are incorporated herein by reference.

Within the Networked Enterprise Server, an object operates in one of two modes:

(a) Networked: In this mode, an object on a computer of one enterprise can interact with objects on remote computers of another enterprise over a communication network, and is protected against faults by the object replication system.

(b) Transactional: In this mode, an object on a computer of one enterprise can interact with a database within its own enterprise, but not with an object on a remote computer of another enterprise, and is protected against faults by the transaction processing system.

These two modes represent the two existing strategies for fault tolerance by replication and by transaction processing. The combination of these two modes represents the unification of replication and transaction processing that is the subject of this invention.

In FIG. 7, the broken lines show the transactions during which the objects operate in Transactional mode. In this example, six transactions 278, 280, 282 and 284, 286, 288 are shown. The number of transactions is determined by the needs of the application.

By default, objects operate in Networked mode. The initial and final operation of each object is in Networked mode 290, 292, 294, 296. Some of the other operations in Networked mode, shown in FIG. 7, are 298, 300 and 302. In Networked mode, an object can interact freely with other objects in its own computer, in other computers, or even in the computers of other enterprises. Some of the interactions with other objects, shown in FIG. 6, are 304, 306, 308, 310, 312, 314, 316 and 318.

An object enters Networked mode when it starts initially 290 and also when it is invoked by a remote object 292. An object enters Transactional mode either by explicitly initiating a transaction 320, 322, or by being invoked by an object that is already part of a transaction. FIG. 8 enumerates the conditions under which a server object S can enter a transaction. The table makes reference to the server object S and also to a client object C that invokes a method of S and thus initiates an activity in S. An object leaves Transactional mode and returns to Networked mode when its transaction commits or aborts.

Case 1. Here neither the client object C nor the server object S is a part of any transaction. The mechanisms of the Networked Enterprise Server pass C's request to S for processing in the normal manner 400.

Case 2. The server object S is a part of transaction Ts but the client object C is not a part of any transaction. The mechanisms of the Networked Enterprise Server queue C's request message until transaction Ts commits and terminates 402. S processes C's request as in Case 1.

Case 3. The client object C is a part of transaction Tc but the server object S is not a part of any transaction. If both C and S are within the same fault tolerance domain, the mechanisms of the Networked Enterprise Server pass C's request message to S, which enters the transaction 404 and processes C's request. Otherwise, the mechanisms of the Networked Enterprise Server reject C's request 406.

Case 4. The client object C is in transaction Tc and the server object S is a part of transaction Ts. If Tc and Ts are the same transaction, the mechanisms of the Networked Enterprise Server pass C's request to S, which processes C's request in the normal manner 408. If Tc and Ts are different transactions, but C and S are within the same fault tolerance domain, the mechanisms of the Networked Enterprise Server queue C's request until transaction Ts commits and terminates 410 and then pass C's request to S for processing as in Case 3. If C and S are not within the same fault tolerance domain, the mechanisms of the Networked Enterprise Server reject C's request 412.

Case 5. This case does not involve a client object C. The server object S initiates a new transaction 414.

The fault tolerance domain of an object is included as a part of the object reference of the object (Object Management Group, Fault Tolerant CORBA Final Adopted Specification, OMG Platform Technical Committee Document ptc/2000-04-04, April 2000, incorporated herein by reference). Thus, when a method is invoked, both the client object and the server object know the fault tolerance domain. When a client object that is in a transaction invokes a method of a server object, the request message that contains the method invocation also contains a transaction context field that carries the identifier of the client's transaction (Object Management Group, Transaction Service Specification v1.2 (Final Draft), OMG Platform Technical Committee Document ptc/2000-11-07, January 2000, incorporated herein by reference). These mechanisms, well known in the art, allow a client object and a server object to determine whether they are within the same fault tolerance domain and also whether they are involved in the same transaction.

A client object, that is part of a transaction (Cases 3 and 4), can invoke a method of a server object only if that server object is within the client's local fault tolerance domain. When a client object, that is part of a transaction, invokes a method of a server object, the server object must become part of the transaction 404.

If a client object, that is part of a transaction, needs to invoke a method of a server object that is not within its local fault tolerance domain, the client object must first commit, and thus terminate, its current transaction.

If a server object, that is part of a transaction (Cases 2 and 4), receives a request from a client object that is not part of any transaction or not part of the server's transaction, the server object cannot process the client's request while the server is in the transaction. Instead, the mechanisms of the Networked Enterprise Server queue the client's request until the server object commits, and thus terminates, the transaction 402, 410.

The invention described here is readily extended to address the nested transactions that some transaction services provide. A nested transaction is formed when an object, that is already part of a transaction, starts a new transaction (J. Gray and A. Reuter, Transaction Processing: Concepts and Techniques, Morgan Kaufmann Publishers, San Mateo, Calif., 1993, incorporated herein by reference). The inner transaction can commit or abort without affecting the outer transaction, but such a commit is not completed until the outer transaction also commits. The outer transaction cannot commit unless all of the inner transactions have committed or aborted, and an abort of the outer transaction aborts all of the inner transactions. In the context of this invention, most of the complexity of nested transactions is handled by the standard mechanisms of a transaction service that provides nested transactions. The only modification to the algorithms described here occurs in FIG. 10A, which is replaced by FIG. 13 as described below Operation in Transactional Mode.

Figure 9:
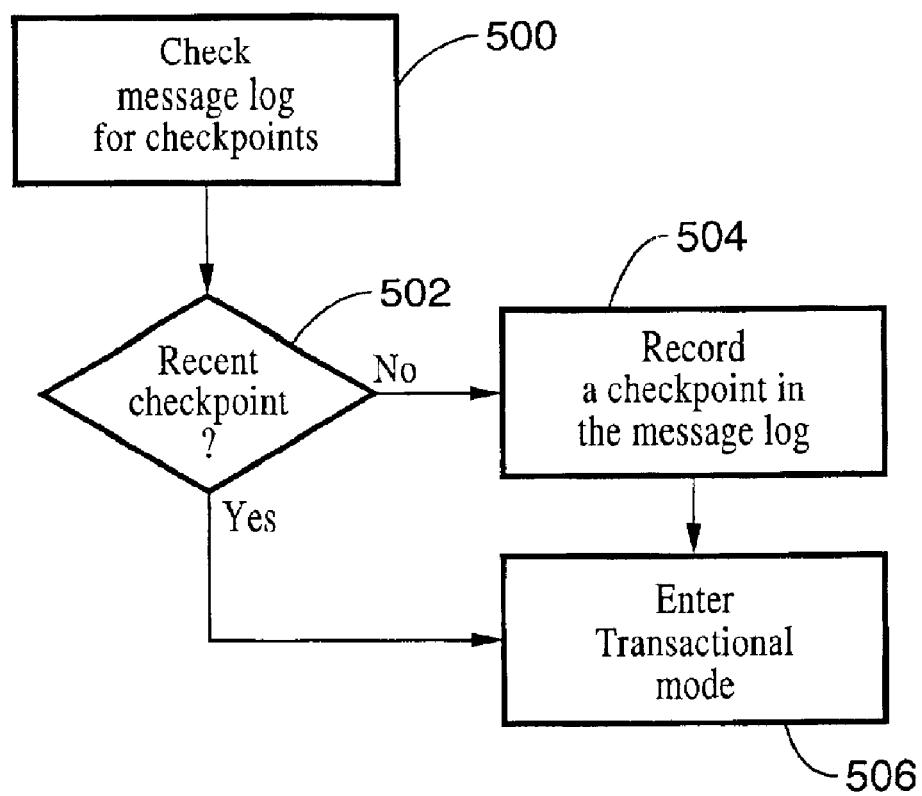
FIG. 9 is a flowchart showing actions on entry to a transaction.
Figure 10:
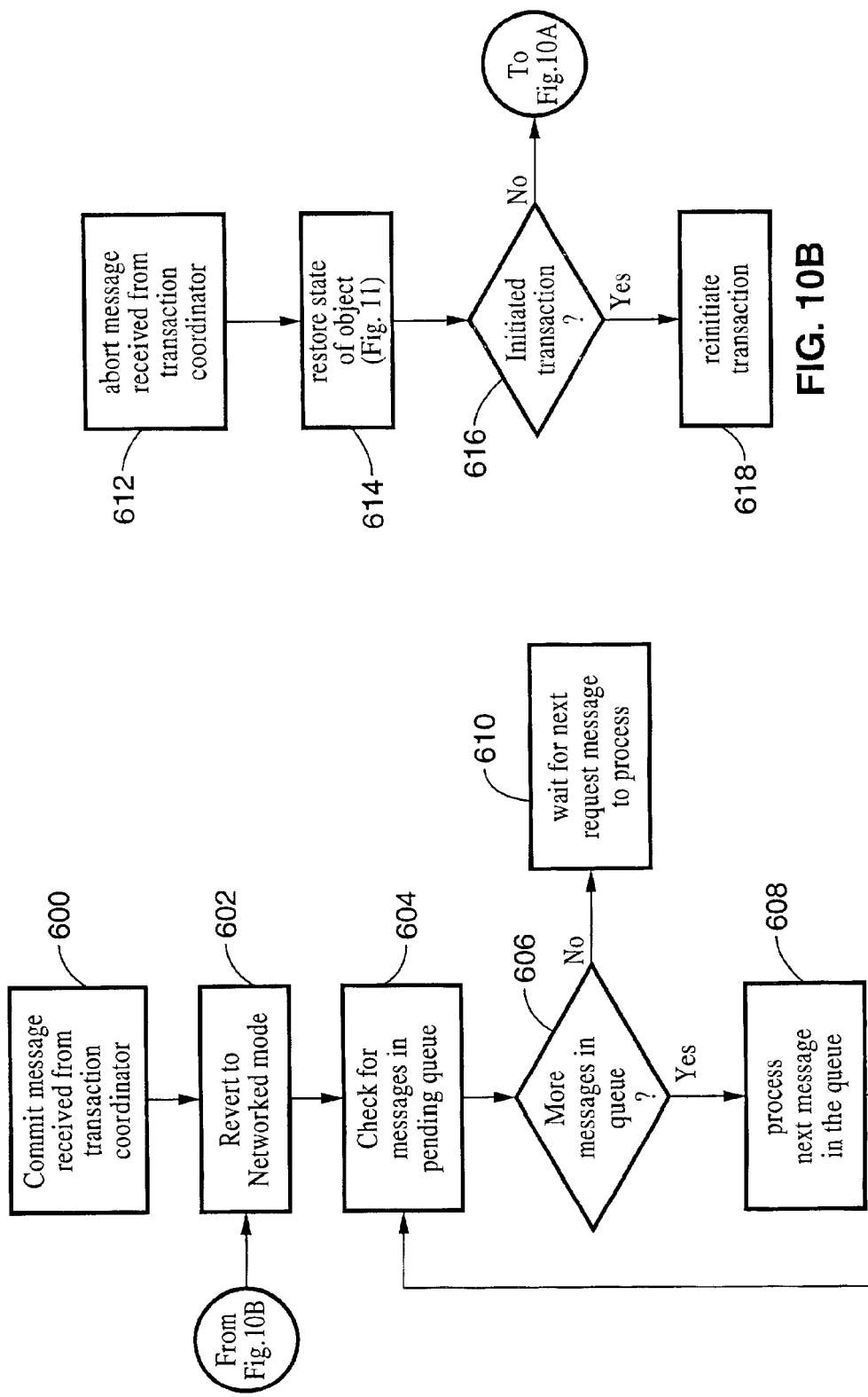
FIG. 10A and FIG. 10B are flowcharts showing actions on transaction commit and actions on transaction abort, respectively.

Within the Networked Enterprise Server, the state of a replicated object must be checkpointed on entry to a transaction, as shown in FIG. 9. However, the entire state need not be checkpointed; rather, it suffices to maintain an existing prior checkpoint together with a log of request and reply messages that the object received since the checkpoint. The mechanisms of the Networked Enterprise Server recover the state of the object on entry to the transaction by restoring the prior checkpoint and by then replaying, from the message log, all of the request and reply messages since that checkpoint. Thus, on entry to the transaction, the mechanisms of the Networked Enterprise Server check the message log at block 500 to determine whether the log contains a recent checkpoint. If there is no recent checkpoint found at block 502, the mechanisms of the Networked Enterprise Server force the generation of a checkpoint and record the checkpoint in the message log at block 504. The object then enters Transactional mode at block 506. Otherwise, block 504 is bypassed if a recent checkpoint is found at block 502.

When an object is in Transactional mode, the mechanisms of the Networked Enterprise Server record all interactions with other objects and all interactions with the local database as request and reply messages in the message log. Periodically, the mechanisms also record a checkpoint of the state of the object in the log. Mechanisms for logging messages and checkpoints are well known in the art.

Transaction Commit

As shown in FIG. 10A, when an object, that is part of a transaction, commits the transaction using the standard two-phase commit protocol at block 600, the object reverts to Networked mode at block 602. The request and reply messages, recorded in the message log during the transaction, are retained for possible future use. At block 604 messages are checked in the pending queue. If messages are queued for the object pending termination of the transaction as determined at block 606, the mechanisms of the Networked Enterprise Server pass those queued messages to the object for processing in the order in which they were enqueued at block 606 until no such messages remain. If no such messages remain, the object then awaits the next request message to process at block 610.

Transaction Abort

Figure 11:
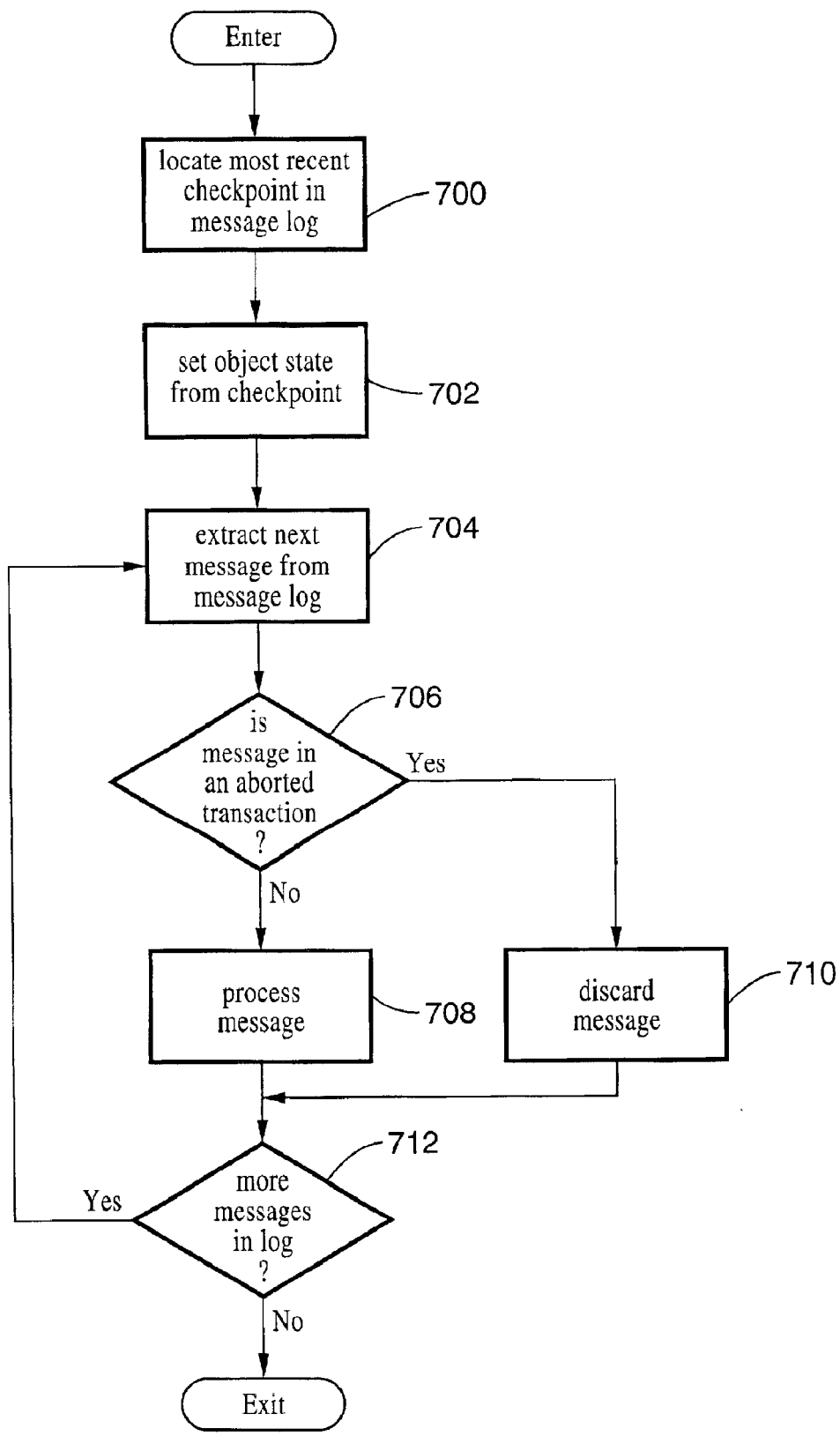
FIG. 11 is a flowchart showing object recovery from the message log.

As shown in FIG. 10B, when an object, that is part of a transaction, aborts the transaction or is instructed to abort the transaction by the transaction commit protocol at block 612, the Networked Enterprise Server restarts the object using the most recent checkpoint in its message log at block 614 as illustrated in FIG. 11. If it is determined at block 616 that the object did not initiate the transaction, the Networked Enterprise Server follow the actions from block 602 in FIG. 10A, and the object reverts to Networked mode. If the object did initiate the transaction, it now reinitiates the transaction at block 618.

When an object aborts the transaction or is instructed to abort the transaction by the two-phase commit protocol, the Networked Enterprise Server restarts the object using the mechanisms illustrated in FIG. 11. The Networked Enterprise Server also uses those mechanisms to start a new or backup replica of an object in Networked mode. As shown in FIG. 11, the mechanisms of the Networked Enterprise Server locate the most recent checkpoint in the log at block 700, and then restore the state of the object using that checkpoint at block 702. Then they replay the request and reply messages recorded in the log after that checkpoint. The mechanisms extract the next message from the log at block 704 and determine whether that message was generated in an aborted transaction at block 706. If the message was not generated within an aborted transaction, the message is passed to the object for processing at block 708. Otherwise, the message is discarded at block 710. The mechanisms extract messages from the message log until no messages remain in the log as determined at block 712, in which case the routine is exited.

None of the results of the aborted transaction attempt can have escaped from the transaction. In particular, none of the results can have been communicated over the network to any computer that is outside the fault tolerance domain. All of the objects that participated in the transaction, and that obtained intermediate results from the transaction, are restarted as a consequence of the transaction abort. Thus, the ACID properties of the transaction are maintained.

Fault Recovery in Networked Mode

Within the Networked Enterprise Server, in Networked mode, fault tolerance is provided by object replication. Unlike transaction processing, which uses a rollback/abort model of recovery, object replication uses a roll-forward model of recovery. The importance of roll-forward recovery in Networked mode is that the mechanisms of the Networked Enterprise Server never retract any message that has been sent across the communication network to another enterprise.

During normal operation in Networked mode, the mechanisms of the Networked Enterprise Server checkpoint the object periodically, and record the checkpoint in the log. The mechanisms also record, in the log, all of the object's request messages, both those that invoke the methods of the object and those by which the object invokes methods of other objects. They also log the corresponding reply messages. The mechanisms record the messages in order in the log. Message logging and checkpointing are well known in the prior art.

If one replica of an object fails, the mechanisms of the Networked Enterprise Server can create a new replica of the object with the same state as an existing replica, as described above and shown in FIG. 11, by first setting the state of the new replica to the most recent checkpoint in the log at block 702 and by then replaying subsequent messages from the log at block 708. The mechanisms can recover each replica of an object individually. Assuming that the objects are deterministic (or rendered deterministic), each replica of an object remains consistent with other replicas of the object, both replicas that have not been affected by the fault and replicas that have been affected and are being recovered. Mechanisms for setting the state of an object from a checkpoint, and for replaying messages from a log, are well known in the prior art.

During recovery and the processing of messages from the log, an object replica can generate further request messages that invoke methods of other objects. Such further request messages can be repetitions of prior messages that have already been transmitted and processed by other objects. If another object processes such a message twice, incorrect results can result.

Figure 12:
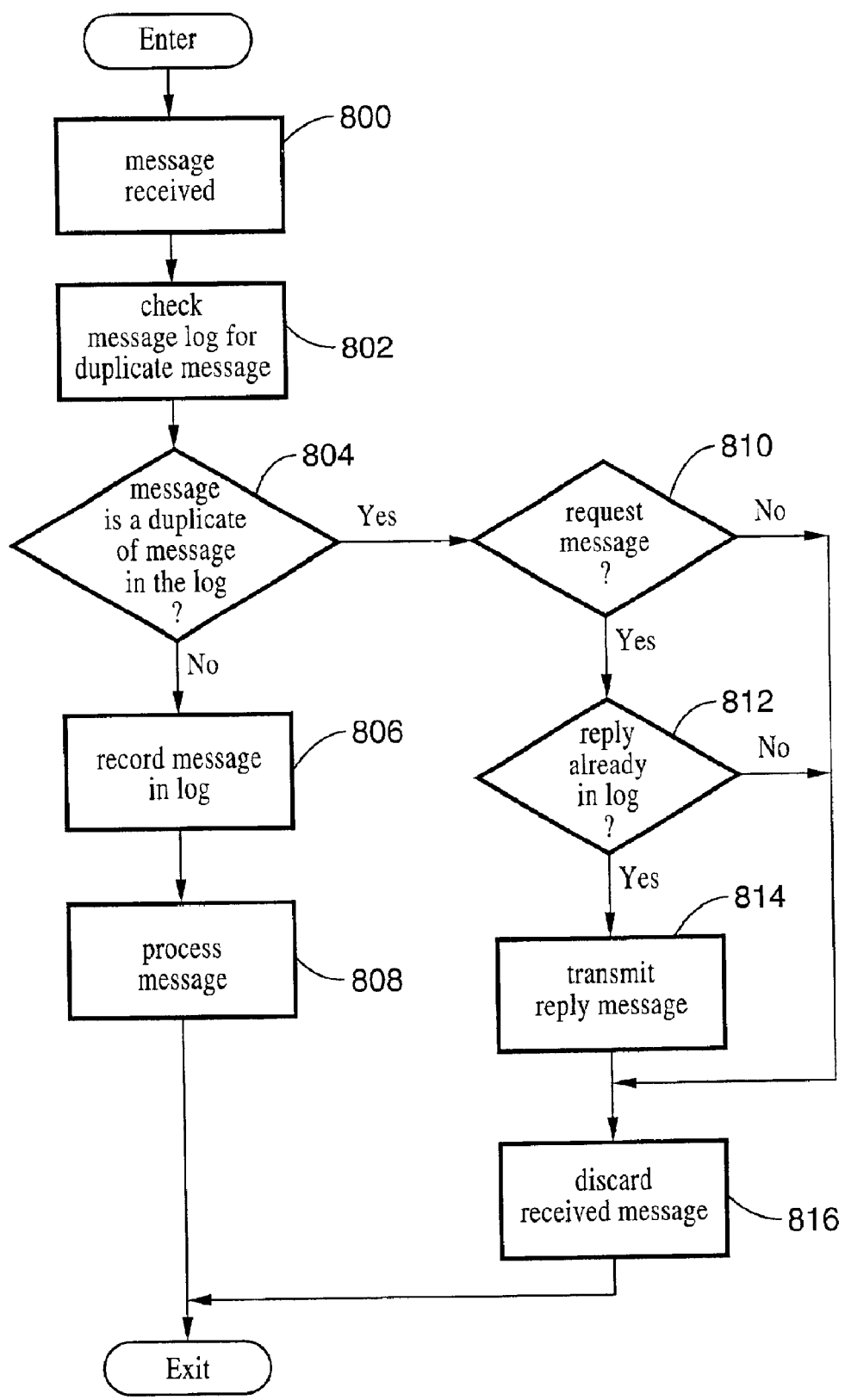
FIG. 12 is a flowchart showing message handling on receipt of a message.

As shown in FIG. 12, when the mechanisms of the Networked Enterprise Server receive a message for an object at block 800, they check the message against the log to determine whether it is a duplicate of a message that is recorded in the log at block 802. If, at block 804, the message is determined not to be a duplicate, the mechanisms record the message in the log at block 806 and deliver the message to the object for normal processing at block 808.

If the message is determined at block 804 to be a duplicate of a message that is recorded in the log at block 804, and if the message is a request message as determined at block 810 for which no reply is recorded in the log as determined at block 812, then the server object is already processing at block 808 the earlier non-duplicate request message and thus the mechanisms can discard the duplicate message. In due course, the server object will generate the reply for the request at block 808.

If at block 804 the message is determined to be a duplicate of a message that is recorded in the log, and if the message is a request message as determined at block 810 for which a reply is recorded in the log as determined at block 812, then the object does not process the message but instead the mechanisms of the Networked Enterprise Server retransmit the reply message from the log at block 814, and discard the duplicate request message at block 816.

Before an object replica became faulty, it might have engaged in a transaction that committed and recorded its results in the database. The recovery of the object replica must include the effects of the transaction in which it participated. During the transaction, the interactions between the object replica and other objects, including the database, are represented as messages that are recorded in the log. During recovery of a failed object replica, the mechanisms of the Networked Enterprise Server replay such messages from the log without involving those other objects, the transaction processing system or the database. In particular, the database values replayed to the object are the values in the messages that the object received when it executed previously, rather than the current database values. Similarly, the mechanisms of the Networked Enterprise Server recognize database update messages generated by the object as duplicates of prior messages and, thus, they do not affect the database. Furthermore, the recovery of an object does not affect the current locking of the database.

The mechanisms of the Networked Enterprise Server record, in the message log, all request and reply messages between an object in a computer of one enterprise and objects in the computers of other enterprises. During recovery of a failed object replica, the mechanisms of the Networked Enterprise Server replay those messages to the recovering object replica in order to set its state without disrupting the operation of objects in the computers of other enterprises. Similarly, if failure of a communication link, or of a remote computer, requires some messages to be retransmitted, the mechanisms of the Networked Enterprise Server extract those messages from the log. Their retransmission does not disrupt the operation of objects in the computers of other enterprises.

Handling Nested Transactions

Figure 13:
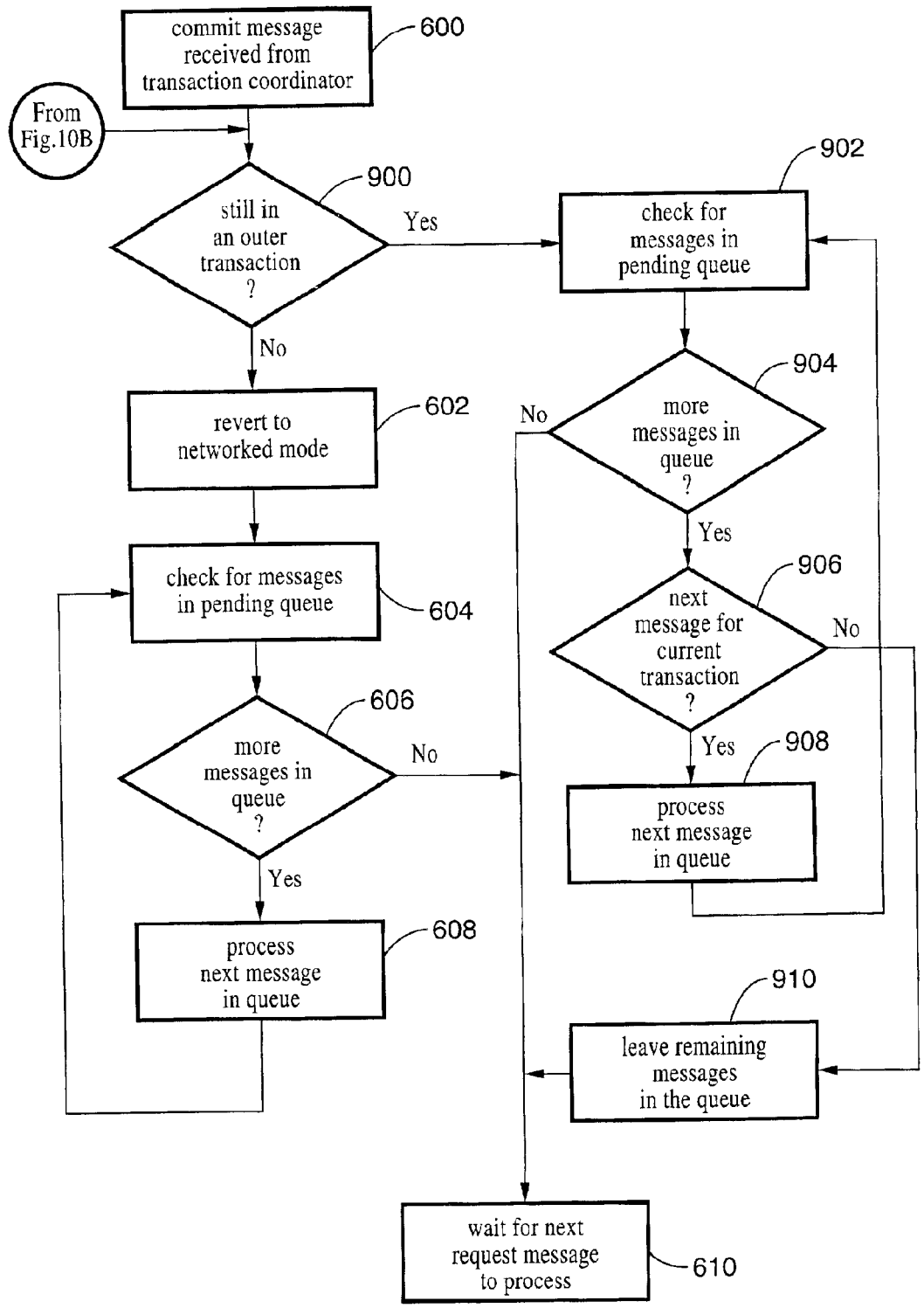
FIG. 13 is a flowchart showing actions on transaction commit for nested transactions.

FIG. 13 shows the modifications required to FIG. 10A to handle nested transactions. The additional actions of the Networked Enterprise Server shown in FIG. 13 to handle nested transactions include, after terminating an inner transaction, a test to determine whether the object still remains in an outer transaction at block 900. If so, the mechanisms required to handle messages in the pending message queue include an additional test to determine whether the next message in the queue is for the current transaction. First, a check is made for messages in the pending queue at block 902. Next, a test for more messages is made at block 904. If, at block 906, it is determined that the next message is for the current transaction, the message is processed at block 908. If the next message is not for the current transaction, all further messages in the pending queue must remain in that queue at block 910 and the object waits for further request messages to process at block 610.

Although the description above contains many specific details, these should not be construed as limiting the scope of the invention but as merely providing illustrations of some of the presently preferred embodiments of this invention. Therefore, it will be appreciated that the scope of the present invention fully encompasses other embodiments, which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem that the present invention seeks to solve, for that device or method to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for providing fault tolerance between computers of different enterprises across a communication network, comprising:
   unifying transaction processing and object or process replication between computers across a communication network;
   wherein a computer program operating on at least one of said computers can recover from a fault while it is communicating with a program on another of said computers across said communication network;
   wherein an object or process operates in a networked mode or a transactional mode;
   wherein in said transactional mode, an object or process on one computer can interact with an object or process in a local database, but not with an object or process on another computer across said communication network; and
   wherein data in transactional mode is protected against faults by a transaction processing system.

2. A method as recited in claim 1, wherein said transaction processing protects local data and processing against faults.

3. A method as recited in claim 1, wherein said replication protects processing and communication across said communication network against faults.

4. A method as recited in claim 1:
   wherein in said networked mode, an object or process on one computer can interact with en object or process on an another computer across said communication network; and
   wherein an object or process in networked mode is protected against faults by an object or process replication system.

5. A method as recited in claim 4:
   wherein an object or process operates in said networked mode by default; and
   wherein in networked mode an object or process can interact freely with another object or process on the same computer, or with an object or process on another computer across said communication network.

6. A method as recited in claim 1:
   wherein an object or process enters transactional mode either by explicitly initiating a transaction, or by being invoked by another object or process that is part of a transaction; and
   wherein in transactional mode, an object or process cannot invoke methods of a remote object or process across said communication network, and cannot accept request messages that originate from an object or process that is not part of the transaction.

7. A method as recited in claim 6, wherein an object or process leaves transactional mode and returns to networked mode when the transaction commits or aborts.

8. A method as recited in claim 1, wherein computers of different enterprises across said communication network maintain consistent views of interactions across said communication network.

9. A method as recited in claim 1, wherein messages sent between computers across said communication network are never retracted.

10. A method as recited in claim 1, wherein a fault in a computer of one enterprise will not abort activities in a computer of another enterprise.

11. A method as recited in claim 1:
    wherein roll-forward recovery is used in networked mode; and
    wherein roil-back/abort recovery is used in transactional mode.

12. A method as recited in claim 11:
    wherein said roll-forward recovery starts from a checkpoint and then replays messages from a message log; and
    wherein messages involved in an aborted transaction are not replayed.

13. A method as recited in claim 12, wherein roll-forward recovery of one object or process does not disrupt continued operation of another object or process or of a database.

14. A method as recited in claim 13, wherein a message generated during roll-forward recovery of an object or process is detected as a duplicate message and is not processed a second time.

15. A method as recited in claim 13, wherein an object or process recovered using roll-forward recovery receives a reply from another object or process and a value from a database that is the same reply and value received during the initial operation of the object or process.

16. A method as recited in claim 1, wherein while an objector process is in transactional mode, a request received from another object or process that is not part of the same transaction is queued until the transaction commits or aborts.

17. A method as recited in claim 16, wherein recovery of an object or process restores the state of the object or process and then processes a message that was queued waiting for a transaction to commit or abort.

18. A method as recited in 17, wherein a message for a current transaction is processed but a message of an enclosing transaction or no transaction remains queued.

19. A method for providing fault tolerance between computers of different enterprises across a communication network, comprising:

unifying transaction processing and object or process or process replication between computers across a communication network;

wherein a computer program operating on at least one of said computers can recover from a fault while it is communicating with a program on another of said computers across said communication network;

wherein an object or process or process operates in a networked mode or a transactional mode;

wherein in said transactional mode, an object or process on one computer can interact with an object or process in a local database, but not with an object or process on another computer across said communication network; and wherein data in transactional mode is protected against faults by a transaction processing system.

20. A method as recited in claim 19, wherein said transaction processing protects local data and processing against faults.

21. A method as recited in claim 19, wherein said replication protects processing and communication across said communication network against faults.

22. A method as recited in claim 19:

wherein in said networked mode, an object or process or process on one computer can interact with an object or process on an another computer across said communication network; and wherein an object or process in networked mode is protected against faults by an object or process replication system.

23. A method as recited in claim 22:

wherein an object or process operates in said networked mode by default; and wherein in networked mode an object or process can interact freely with another object or process on the same computer, or with an object or process on another computer across said communication network.

24. A method as recited in claim 19:

wherein an object or process enters transactional mode either by explicitly initiating a transaction, or by being invoked by another object or process that is part of a transaction; and wherein in transactional mode, an object or process cannot invoke methods of a remote object or process across said communication network, and cannot accept request messages that originate from an object or process that is not part of the transaction.

25. A method as recited in claim 24, wherein an object or process leaves transactional mode and returns to networked mode when the transaction commits or aborts.

26. A method as recited in claim 19, wherein computers of different enterprises across said communication network maintain consistent views of interactions across said communication network.

27. A method as recited in claim 19, wherein messages sent between computers across said communication network are never retracted.

28. A method as recited in claim 19, wherein a fault in a computer of one enterprise will not abort activities in a computer of another enterprise.

29. A method as recited in claim 19:

wherein roll-forward recovery is used in networked mode; and wherein roll-back/abort recovery is used in transactional mode.

30. A method as recited in claim 29:

wherein said roll-forward recovery starts from a checkpoint and then replays messages from a message log: and wherein messages Involved in an aborted transaction are not replayed.

31. A method as recited in claim 30, wherein roll-forward recovery of one object or process does not disrupt continued operation of another object or process or of a database.

32. A method as recited in claim 31, wherein a message generated during roll-forward recovery of an object or process is detected as a duplicate message and is not processed a second time.

33. A method as recited in claim 31, wherein an object or process recovered using roll-forward recovery receives a reply from another object or process and a value from a database that is the same reply and value received during the initial operation of the object or process.

34. A method as recited in claim 19, wherein while en object or process is in transactional mode, a request received from another object or process that is not part of the same transaction is queued until the transaction commits or aborts.

35. A method as recited in claim 34, wherein recovery of an object or process restores the state of the object or process and then processes a message that was queued waiting for a transaction to commit or abort.

36. A method as recited in 35, wherein a message for a current transaction is processed but a message of an enclosing transaction or no transaction remains queued.

37. A method for providing fault tolerance between computers of different enterprises across a communication network, comprising:

unifying transaction processing and object or process replication between computers across a communication network;

wherein a computer program operating on at least one of said computers can recover from a fault while it is communicating with a program on another of said computers across said communication network;

wherein an object or process operates in a networked mode or a transactional mode;

wherein in said networked mode, an object or process on one computer can interact with an object or process on an another computer across said communication network;

wherein an object or process in networked mode is protected against faults by an object or process replication system;

wherein in said transactional mode, an object or process on one computer can interact with an object or process in a local database, but not with an object or process on another computer across said communication network; and wherein data in transactional mode is protected against faults by a transaction processing system.

38. A method as recited in claim 37, wherein said transaction processing protects local data and processing against faults.

39. A method as recited in claim 37, wherein said replication protects processing and communication across said communication network against faults.

40. A method as recited in claim 37:

wherein an object or process operates in said networked mode by default; and wherein in networked mode an object or process can interact freely with another object or process on the same computer, or with an object or process on another computer across said communication network.

41. A method as recited in claim 37:
wherein an object or process enters transactional mode either by explicitly initiating a transaction, or by being invoked by another object or process that is part of a transaction; and
wherein in transactional mode, an object or process cannot invoke methods of a remote object or process across said communication network, and cannot accept request messages that originate from an object or process that is not part of the transaction.

42. A method as recited in claim 41, wherein an object or process leaves transactional mode and returns to networked mode when the transaction commits or aborts.

43. A method as recited in claim 37, wherein computers of different enterprises across said communication network maintain consistent views of interactions across said communication network.

44. A method as recited in claim 37, wherein messages sent between computers across said communication network are never retracted.

45. A method as recited in claim 37, wherein a fault in a computer of one enterprise will not abort activities in a computer of another enterprise.

46. A method as recited in claim 37:
wherein roll-forward recovery is used in networked mode; and
wherein roll-back/abort recovery is used in transactional mode.

47. A method as recited in claim 46:
wherein said roll-forward recovery starts from a checkpoint and then replays messages from a message log; and
wherein messages involved in an aborted transaction are not replayed.

48. A method as recited in claim 47, wherein roll-forward recovery of one object or process does not disrupt continued operation of another object or process or of a database.

49. A method as recited in claim 48, wherein a message generated during roll-forward recovery of an object or process is detected as a duplicate message and is not processed a second time.

50. A method as recited in claim 48, wherein an object or process recovered using roll-forward recovery receives a reply from another object or process and a value from a database that is the same reply and value received during the initial operation of the object or process.

51. A method as recited in claim 37, wherein while an object or process is in transactional mode, a request received from another object or process that is not part of the same transaction is queued until the transaction commits or aborts.

52. A method as recited in claim 51, wherein recovery of an object or process restores the state of the object or process and then processes a message that was queued waiting for a transaction to commit or abort.

53. A method as recited in claim 52, wherein a message for a current transaction is processed but a message of an enclosing transaction or no transaction remains queued.

54. A method for providing fault tolerance between computers of different enterprises across a communication network, comprising:
unifying transaction processing and object or process replication between computers across a communication network;
wherein a computer program operating on at least one of said computers can recover from a fault while it Is communicating with a program on another of said computers across said communication network;
wherein an object or process operates in a networked mode or a transactional mode;
wherein in said transactional mode, an object or process on one computer can interact with an object or process in a local database, but not with an object or process on another computer across said communication network; and
wherein data in transactional mode is protected against faults by a transaction processing system.

55. A method as recited in claim 54, wherein said transaction processing protects local data and processing against faults.

56. A method as recited in claim 54, wherein said replication protects processing and communication across said communication network against faults.

57. A method as recited in claim 54:
wherein in said networked mode, an object or process on one computer can interact with an object or process on an another computer across said communication network; and
wherein an object or process in networked mode is protected against faults by an object or process replication system.

58. A method as recited in claim 57:
wherein an object or process operates in said networked mode by default; and
wherein in networked mode an object or process can interact freely with another object or process on the same computer, or with an object or process on another computer across said communication network.

59. A method as recited in claim 54:
wherein an object or process enters transactional mode either by explicitly initiating a transaction, or by being invoked by another object or process that is part of a transaction; and
wherein in transactional mode, an object or process cannot invoke methods of a remote object or process across said communication network, and cannot accept request messages that originate from an object or process that is not part of the transaction.

60. A method as recited in claim 59, wherein an object or process leaves transactional mode and returns to networked mode when the transaction commits or aborts.

61. A method as recited in claim 54, wherein computers of different enterprises across said communication network maintain consistent views of interactions across said communication network.

62. A method as recited in claim 54, wherein messages sent between computers across said communication network are never retracted.

63. A method as recited in claim 54, wherein a fault in a computer of one enterprise will not abort activities in a computer of another enterprise.

64. A method as recited in claim 54:
wherein roll-forward recovery is used in networked mode; and
wherein roll-back/abort recovery is used in transactional mode.

65. A method as recited in claim 64:
wherein said roll-forward recovery starts from a checkpoint and then replays messages from a message log; and
wherein messages involved in an aborted transaction are not replayed.

66. A method as recited in claim 65, wherein roll-forward recovery of one object or process does not disrupt continued operation of another object or process or of a database.

67. A method as recited in claim 66, wherein a message generated during roll-forward recovery of an object or process is detected as a duplicate message and is not processed a second time.

68. A method as recited in claim 66, wherein an object or process recovered using roll-forward recovery receives a reply from another object or process and a value from a database that is the same reply and value received during the initial operation of the object or process.

69. A method as recited in claim 54, wherein while an object or process is in transactional mode, a request received from another object or process that is not part of the same transaction is queued until the transaction commits or aborts.

70. A method as recited in claim 69, wherein recovery of an object or process restores the state of the object or process and then processes a message that was queued waiting for a transaction to commit or abort.

71. A method as recited in 70, wherein a message for a current transaction is processed but a message of an enclosing transaction or no transaction remains queued.

72. A method for providing fault tolerance between computers of different enterprises across a communication network, comprising:
  unifying transaction processing and object or process replication between computers across a communication network;
  wherein a computer program operating on at least one of said computers can recover from a fault while it is communicating with a program on another of said computers across said communication network;
  wherein an object or process operates in a networked mode or a transactional mode;
  wherein roll-forward recovery is used in networked mode;
  wherein roll-back/abort recovery is used in transactional mode;
  wherein in said transactional mode, an object or process on one computer can interact with an object or process in a local database, but not with an object or process on another computer across said communication network; and
  wherein data in transactional mode is protected against faults by a transaction processing system.

73. A method as recited in claim 72, wherein said transaction processing protects local data and processing against faults.

74. A method as recited in claim 72, wherein said replication protects processing and communication across said communication network against faults.

75. A method as recited in claim 72:
  wherein in said networked mode, an object or process on one computer can interact with an object or process on an another computer across said communication network; and
  wherein an object or process in networked mode is protected against faults by an object or process replication system.

76. A method as recited in claim 75:
  wherein an object or process operates in said networked mode by default; and
  wherein in networked mode an object or process can interact freely with another object or process on the same computer, or with an object or process on another computer across said communication network.

77. A method as recited in claim 72:
  wherein an object or process enters transactional mode either by explicitly initiating a transaction, or by being invoked by another object or process that is part of a transaction; and
  wherein in transactional mode, an object or process cannot invoke methods of a remote object or process across said communication network, and cannot accept request messages that originate from an object or process that is not part of the transaction.

78. A method as recited in claim 77, wherein an object or process leaves transactional mode and returns to networked mode when the transaction commits or aborts.

79. A method as recited in claim 72, wherein computers of different enterprises across said communication network maintain consistent views of interactions across said communication network.

80. A method as recited in claim 72, wherein messages sent between computers across said communication network are never retracted.

81. A method as recited in claim 72, wherein a fault in a computer of one enterprise will not abort activities in a computer of another enterprise.

82. A method as recited in claim 72:
  wherein said roll-forward recovery starts from a checkpoint and then replays messages from a message log; and
  wherein messages involved in an aborted transaction are not replayed.

83. A method as recited in claim 82, wherein roll-forward recovery of one object or process does not disrupt continued operation of another object or process or of a database.

84. A method as recited in claim 83, wherein a message generated during roll-forward recovery of an object or process is detected as a duplicate message and is not processed a second time.

85. A method as recited in claim 83, wherein an object or process recovered using roll-forward recovery receives a reply from another object or process and a value from a database that is the same reply and value received during the initial operation of the object or process.

86. A method as recited in claim 72, wherein while an object or process is in transactional mode, a request received from another object or process that is not part of the same transaction is queued until the transaction commits or aborts.

87. A method as recited in claim 86, wherein recovery of an object or process restores the state of the object or process and then processes a message that was queued waiting for a transaction to commit or abort.

88. A method as recited in 87, wherein a message for a current transaction is processed but a message of an enclosing transaction or no transaction remains queued.

89. A method for providing fault tolerance between computers of different enterprises across a communication network, comprising:
  unifying transaction processing and object or process replication between computers across a communication network;
  wherein a computer program operating on at least one of said computers can recover from a fault while it is communicating with a program on another of said computers across said communication network;
  wherein an object or process operates in a networked mode or a transactional mode;
  wherein while an object or process is in transactional mode, a request received from another object or process that is not part of the same transaction is queued until the transaction commits or aborts;

wherein in said transactional mode, an object or process on one computer can interact with an object or process in a local database, but not with an object or process on another computer across said communication network; and wherein data in transactional mode is protected against faults by a transaction processing system.

90. A method as recited in claim 89, wherein said transaction processing protects local data and processing against faults.

91. A method as recited in claim 89, wherein said replication protects processing and communication across said communication network against faults.

92. A method as recited in claim 89:

wherein in said networked mode, an object or process on one computer can interact with an object or process on an another computer across said communication network; and wherein an object or process in networked mode is protected against faults by an object or process replication system.

93. A method as recited in claim 92:

wherein an object or process operates in said networked mode by default; and wherein in networked mode an object or process can interact freely with another object or process on the same computer, or with an object or process on another computer across said communication network.

94. A method as recited in claim 89:

wherein an object or process enters transactional mode either by explicitly initiating a transaction, or by being invoked by another object or process that is part of a transaction; and wherein in transactional mode, an object or process cannot invoke methods of a remote object or process across said communication network, and cannot accept request messages that originate from an object or process that is not part of the transaction.

95. A method as recited in claim 94, wherein an object or process leaves transactional mode and returns to networked mode when the transaction commits or aborts.

96. A method as recited in claim 89, wherein computers of different enterprises across said communication network maintain consistent views of interactions across said communication network.

97. A method as recited in claim 89, wherein messages sent between computers across said communication network are never retracted.

98. A method as recited in claim 89, wherein a fault in a computer of one enterprise will not abort activities in a computer of another enterprise.

99. A method as recited in claim 89:

wherein roll-forward recovery is used in networked mode; and wherein roll-back/abort recovery is used in transactional mode.

100. A method as recited in claim 99:

wherein said roll-forward recovery starts from a checkpoint and then replays messages from a message log; and wherein messages involved in an aborted transaction are not replayed.

101. A method as recited in claim 100, wherein roll-forward recovery of one object or process does not disrupt continued operation of another object or process or of a database.

102. A method as recited in claim 101, wherein a message generated during roll-forward recovery of an object or process is detected as a duplicate message and is not processed a second time.

103. A method as recited in claim 100, wherein an object or process recovered using roll-forward recovery receives a reply from another object or process and a value from a database that is the same reply and value received during the initial operation of the object or process.

104. A method as recited in claim 89, wherein recovery of an object or process restores the state of the object or process and then processes a message that was queued waiting for a transaction to commit or abort.

105. A method as recited in 104, wherein a message for a current transaction is processed but a message of an enclosing transaction or no transaction remains queued.

\* \* \* \* \*